United States Patent
Retzlaff et al.

(10) Patent No.: US 6,887,360 B2
(45) Date of Patent: May 3, 2005

(54) STABLE, REDUCED GLOSS ELECTROCOAT COMPOSITIONS AND METHODS FOR USING THE SAME

(75) Inventors: Udo Retzlaff, Wattenscheid (DE); Anna K. Gaines, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 351 days.

(21) Appl. No.: 09/977,139

(22) Filed: Oct. 12, 2001

(65) Prior Publication Data

US 2003/0150729 A1 Aug. 14, 2003

(51) Int. Cl.[7] .............................. C08F 2/58; C09D 5/44; C25D 13/00; C25D 15/00
(52) U.S. Cl. ..................... 204/489; 204/492; 204/499; 523/411; 523/412
(58) Field of Search .................... 204/489, 492, 204/499, 500; 523/411, 412

(56) References Cited

U.S. PATENT DOCUMENTS

| | | | |
|---|---|---|---|
| 4,536,525 A | * 8/1985 | Freese et al. | 523/414 |
| 4,975,475 A | 12/1990 | Tsuchiya et al. | 523/411 |
| 5,284,881 A | 2/1994 | Mizuguchi et al. | 521/57 |
| 5,792,803 A | * 8/1998 | Savin | 523/219 |
| 5,880,250 A | * 3/1999 | Housel et al. | 528/272 |

FOREIGN PATENT DOCUMENTS

| | | |
|---|---|---|
| EP | 0 433 783 | 6/1991 |
| EP | 0358221 | 11/1993 |
| EP | 0 653 444 | 5/1995 |
| GB | 2074578 A * | 11/1981 |
| JP | 6073314 | 3/1994 |
| JP | 07331132 | 2/1996 |
| JP | 9052919 | 5/1997 |
| JP | 9157545 | 8/1997 |

* cited by examiner

*Primary Examiner*—Kishor Mayekar
(74) *Attorney, Agent, or Firm*—Diane R. Meyers

(57) ABSTRACT

Electrocoat compositions providing coatings having reduced gloss levels are disclosed. The reduction in gloss is achieved through the incorporation of a solid polymer additive to a standard electrocoat composition. The polymer additive includes particulate polyacrylate, particulate aliphatic polyurethane/polyurea copolymers, or mixtures thereof. Low and medium gloss compositions can be achieved. A paste containing these polymer additives is also disclosed. Methods for using these compositions are also disclosed, as are methods for reducing the gloss of an E-coat composition.

55 Claims, No Drawings

STABLE, REDUCED GLOSS ELECTROCOAT COMPOSITIONS AND METHODS FOR USING THE SAME

FIELD OF THE INVENTION

The present invention relates to electrodepositable compositions and their use. The present compositions have both reduced gloss and superior anti-settling properties, good filterability, and improved gloss retention and color as compared with other electrocoat compositions; this combination of features is difficult to obtain with conventional electrocoat compositions.

BACKGROUND OF THE INVENTION

Electrodeposition as a coating application method involves the deposition onto a conductive substrate of a film-forming composition under the influence of an applied electrical potential. Electrodeposition has gained popularity in the coatings industry because it provides higher paint utilization, outstanding corrosion resistance, and low environmental contamination as compared with non-electrophoretic coating methods. Both cationic and anionic electrodeposition are used commercially, with cationic being more prevalent in applications desiring a high level of corrosion protection. Anionic electrodeposition is typically used for decorative applications, particularly where low cost and decorative qualities such as gloss and color are desired. Electrodepositable cationic acrylic vehicles with optional minor amounts of cationic epoxy are typically used for applications in which both decorative and anti-corrosion properties are desirable.

There are a number of decorative applications in which it is desired to control the gloss of a coating layer applied by electrodeposition. E-coat compositions having high gloss levels are readily achievable, but compositions with a low gloss level that is retained after exterior exposure have been very hard to prepare. Addition of traditional flatting agents such as silicas and alumina silicates to E-coat compositions will produce the desired gloss levels initially, but the finishes discolor and chalk quickly upon exposure to the elements. Furthermore, traditional flatting agents are often much more dense than other bath components and will settle in the electrocoat baths; continuous recirculation must therefore be employed to maintain paint homogeneity, even when the bath is not in use. The need for continuous recirculation leads to higher capital equipment costs, higher maintenance costs, and higher energy costs.

Another issue that arises with electrocoat application is dirt removal. Metal parts being coated are invariably contaminated to one degree or another with particulate matter that can accumulate in the electrocoat tank. The particles must be removed to insure a defect-free paint finish. This is typically accomplished by continuous filtration of the electrocoat bath. Known flatting agents, especially organic flatting agents, interfere with this dirt removal process by fouling filtration equipment.

SUMMARY OF THE INVENTION

The present invention is generally directed to electrocoat compositions comprising an electrodepositable resin and a solid polymer additive in particulate or beaded form. The electrocoat ("E-coat") composition can be any one, two or three component system known in the art. The polymer additive can be, for example, a polyacrylate material, an aliphatic polyurethane/polyurea copolymer or mixtures thereof. It has been surprisingly discovered that the use of these solid particulate polymers in E-coat compositions reduces the gloss of the coating. Significantly, this reduced gloss is achieved without sacrificing other performance characteristics, which sacrifice is typically seen with other flatting agents. Indeed, the present compositions have a number of properties superior to commercially available products. Gloss levels can be reduced, for example, to result in low gloss and medium gloss formulations. "Low gloss" generally refers to gloss readings of less than 40 as measured on a 60° meter; "medium gloss" refers to readings of 40 to 70 measured in the same manner. In addition, the gloss level of high gloss compositions can be reduced according to the present invention. "High gloss" refers to readings of greater than 70 as measured on a 60° meter.

The present electrocoat compositions are have superior anti-settling properties. Solids found in electrocoat baths, particularly solids traditionally used as flatting agents, can settle to the bottom of an E-coat bath unless constant circulation is employed. Because these materials, such as silicas and alumina silicates, are often quite dense, they not only settle but once settled resist redispersion in the formulation. The present polymer additives, however, tend to have a relatively low density. As such, they not only resist settling in an electrocoat bath, but if they do settle, they are easily redispersed. Thus, the present invention allows the E-coat bath user to eliminate the continuous circulation typically required in the operation of these baths. This represents a significant cost savings to the user. Significantly, because of the ease with which the present additives reincorporate, it has been found that there is less variation in gloss from the top to the bottom of a substrate. In other systems, when agitation is poor the concentration of flatting agent can differ from one area to another and so, for example, the bottom portion of a substrate might have a different gloss than the top portion of the same substrate. That problem has been minimized, if not eliminated, by use of the present additives.

In addition, the present electrocoat compositions have superior gloss retention, particularly as compared with other low to medium gloss formulations. "Gloss retention" or the ability to "maintain gloss" means that the coating does not readily experience reduced gloss upon weathering, such as through UV exposure, rain and snow exposure, and the like. Significant enhancement in weatherability and increased hardness are achieved with the present compositions. Thus, the present invention allows for the formulation of electrocoats having the desired level of gloss with durability equal to or superior to that of other commercially available products; the compositions are low in both initial and retained gloss, are filterable for dirt removal, are nonsettling, and show minimal color drift on exposure. The solid polymer additives can be incorporated into the E-coat composition, for example, by formulating them into an electrocoat paste comprising a grind vehicle and the polymer additive.

The present invention is further directed to methods for electrocoating a conductive substrate by applying to the substrate a coating derived from the composition of the present invention. The compositions can be applied as any layer in the treatment of a substrate. Application of primer coats and topcoats are particularly suitable.

The present invention is also directed to a method for reducing the gloss of an electrocoat composition comprising adding an effective amount of the solid particulate polymer material described above to the electrocoat composition.

Finally, the present invention is directed to a reduced-gloss E-coat composition having superior anti-settling and gloss retention properties.

DETAILED DESCRIPTION OF THE INVENTION

The present invention is generally directed to electrocoat compositions comprising an electrodepositable resin and a polymer additive in solid particulate form. The polymer additive can be solid polyacrylate particles or solid aliphatic polyurethane/polyurea copolymer particles. Mixtures of these additives can also be employed.

The terms "polymer additive" and "particulate polymer" refer herein to the solid polyacrylate or polyurethane/polyurea additives described herein, which impart flatting, anti-settling, filterability and/or weatherability characteristics to the present compositions. These additives can be used in addition to or in place of conventional additives added for these purposes.

The polymer additives are in solid particulate or beaded form. Additionally, the particles are usually nonionic and are inert, that is, they contain no reactive functional groups that would react with the other components in the E-coat bath. By "solid" is meant the polymer additives have a softening point of greater than 30° C., such as greater than 50° C., with the softening point being determined according to ASTM E1545-95a, Procedure B.

Suitable polymer additives include particles comprising acrylic polymers, polyurethane polymers, polyurea polymers or mixtures thereof. Polymers comprising acrylic monomers are particularly advantageous, especially crosslinked polymethyl methacrylate. A beaded polymethyl methacrylate is commercially available from Maroon Incorporated, Avon, Ohio, under the name DECOSILK ART. Polymethyl methacrylate particles are also available from Sekisui Plastics Co. Ltd. in their Techpolymer MBX Series. A highly crosslinked aliphatic polyurethane/polyurea copolymer is commercially available from Maroon as DECOSOFT. All of these products are suitable for use in the present invention.

One feature of the polymer additives of the present invention is that they are essentially insoluble in the electrodepositable composition at all times, such as during storage, handling, and application. Insolubility can be achieved through monomer selection, those monomers providing high glass transition temperature ("Tg") (i.e. >50° C.) polymers being particularly suitable. Insolubility can also be achieved through crosslinking. Crosslinking of the particles lowers the solubility of the particles in the bath, even when Tg polymers <50° C. are used. Insolubility of the particles contributes to good bath stability over time and good filterability.

Another feature of the present particles is their density. Particles with a density equal to 1 up to about 1.5 are desired, such as those having a density ranging between 1.05 and 1.35. This property also contributes to the anti-settling feature of the present compositions. Higher density particles (i.e. >1.5) can result in excessive settling of the composition with time, while lower density particles (i.e. <1.0) can lead to floating. Both floating and settling lead to the need for agitation.

A third feature of the polymer additives is their size and size distribution. Generally, the particles will range in average particle size from 1 to 25 microns, such as 10 to 25 microns. The particle size distribution helps maintain the filiterability of the composition, which removes the dirt that typically accumulates in an unfiltered bath. The approximate upper limit of particle size distribution can be expressed as % by weight of particles above a certain size. Less than 1% of polymer additive above 50 microns, such as less than 1% of the polymer additive above 25 microns, is typically suitable to achieve a desired filterability. In one embodiment, 70% of the particles are between 2 and 15 microns.

As noted above, the polymer is in particulate form. The shape of the particles is typically spherical. For certain E-coat applications where a coating thickness of approximately one mil is achieved, an average particle size of approximately 20 microns or less is typically desired, such as about 10 microns or even smaller. For E-coat applications in which a thicker coat is deposited, such as 2 or 3 mils, or wherein the "smoothness" of the coating is not important, larger particle sizes can be employed, such as particles up to about 50 microns. These are only examples, however, and the present compositions and methods are not restricted by particle size.

Any electrodepositable resin known in the art can be used according to the present invention. Both cationic and anionic electrodepositable resins can be used. Suitable cationic resins are described, for example, in U.S. Pat. Nos. 4,891, 111 and 6,190,524, both of which are incorporated herein by reference. A particularly suitable cationic resin is a sulfonium acrylic E-coat, such as those products in the POWERCRON 900 Series sold by PPG Industries, Inc. The resin of the present composition can also be anionic; suitable examples are also sold by PPG Industries, Inc. in the POWERCRON series, such as those POWERCRON products designated as 150, 200, 210, 230, 290, 300 and 330, for example.

U.S. Pat. No. 6,190,524 describes particularly suitable cationic polyepoxide resins that may be chain extended by reacting together a polyepoxide and polyhydroxyl group-containing material selected from alcoholic hydroxyl group-containing materials and phenolic hydroxyl group-containing materials to chain extend or build the molecular weight of the polyepoxide. Cationic resins that are the reaction products of a polyepoxide with an oxygen-substituted diamine compound are also suitable; such compounds are described in U.S. Pat. No. 5,820,987, also incorporated by reference herein. Both high epoxy and low epoxy resins can be used. Other suitable resins are described in U.S. Pat. Nos. 3,455,806; 3,663,389; 3,793,278; 3,928, 157; 3,947,338; 3,947,339; 3,962,165; 3,975,346; 3,984, 299; 3,984,922; 4,001,101; 4,134,866; 4,134,932; and European Application No. 12463, the relevant portions of which are all hereby incorporated by reference.

The amount of the solid particulate polymer in the electrocoat composition will vary depending on the needs and desires of the user based upon such parameters as, for example, the desired gloss level, the amount of durability or gloss retention needed, and the like. The particulate polymer concentration in the present electrocoating compositions can be as high or low as needed for a particular system; for example, the amount can range between about 0.01 and 30 weight percent, such as between about 10 and 25 weight percent, with weight percent being based upon the total weight of the composition. It will be appreciated that the more polymer additive, the lower the gloss.

The particulate polymer used in the present invention can be added to the electrodepositable resin at any stage during formulation. In one embodiment, the polymer additive is incorporated into the electrocoating composition by means of an electrocoat paste, in which the particulate polymer is ground in a pigment grinding mill with a grind vehicle and optionally one or more pigments or extenders. Any grind vehicle standardly used in the electrocoat art can be used, absent compatibility problems. Examples include acrylic grind vehicles and epoxy grind vehicles. Epoxy-based grind vehicles are particularly appropriate for use in one-coat cationic acrylic resin applications, and are commercially available from PPG Industries, Inc. Although referred to as epoxy grind vehicles, these vehicles are more accurately described as grind vehicles derived from epoxy resins in which the epoxy functionality has been reacted and is no longer present in the grind vehicle. Acrylic vehicles are particularly suitable for use in one and two-coat processes wherein the coat functions as a final layer, and are also commercially available from PPG. Typically, in such vehicles a pigment and/or other solids are ground or mixed in a pigment grinding mill after which a liquid carrier, such as water and/or organic solvents, is added. The particulate polymer can be incorporated in conjunction with the liquid carrier or after the liquid carrier has been added. It is typically not desirable to grind the polymer additives with the pigments or extenders, because grinding will change the particle size. In any event, grinding of the present particles is not necessary; eliminating the need to grind the particulate polymer represents another advantage of the present invention. The particulate polymer additives are easily incorporated into the grind vehicle by low-shear mixing until fully incorporated. Typically, this takes about 15 to 30 minutes, and can be performed, for example, using any kind of mixer such as those equipped with a Cowles blade. A shear speed of around 5 to 10 m/second is typically sufficient. In addition to any pigment that might be incorporated into the grind vehicle, the polymer additives themselves can be colored. For example, the DECOSILK ART and DECOSOFT products are available in a number of different opaque colors. Transparent polymer additives can also be incorporated. The use of opaque versus transparent polymer additives will depend on the needs and desires of the user.

The present invention is further directed to an electrocoat paste suitable for use in an electrocoat composition comprising a grind vehicle, the solid particulate polymer additive, and optionally a liquid carrier, as those terms are defined herein. The carrier and polymer additive can be any of these described above. A pigment can also be added and can be any standard E-coat pigment known in the art. The particulate polymer additive will typically comprise between 0.01 and 30 weight percent of the electrocoat paste, such as between about 1 and 3 weight percent, with weight percent being based on the total weight of the paste.

It will be appreciated that introduction of the polymer additive through the electrocoat paste or grind vehicle is merely one means of adding the particulate polymer into the present coatings; any other means known in the art can also be employed, such as through any other means known in the art to wet out particles for an E-coat formulation. For example, the polymer additive can be incorporated into the electrodepositable resin itself. In addition, the polymer additives can be added directly to the E-coat bath. The ability to incorporate the present flatting agents directly without grinding them into another vehicle is another significant advantage of the present invention. This is particularly relevant in the E-coat process where a large volume E-coat bath is almost constantly being replenished.

The compositions of the present invention can be used in an electrodeposition process in the form of an aqueous dispersion, wherein a resinous phase is dispersed in an aqueous medium. The resinous phase includes the electrodepositable resin and polymer additive described above. Water and/or organic solvent(s) most typically comprises the aqueous medium. Resin, pigment, polymer additive and the like comprise the insoluble dispersed phase, while water, water miscible organic solvents and water soluble materials comprise the continuous phase. The dispersion typically comprises between about 0.1 and 70, such as between about 1 and 35 weight percent solids of which between about 0.01 and 20, such as between about 0.01 and 2, are the polymer additives of the present invention, with weight percent being based on the total weight of the bath/dispersion.

In addition to water, the aqueous medium may contain a coalescing solvent. Useful coalescing solvents include hydrocarbons, alcohols, esters, ethers and ketones. Specific coalescing solvents include isopropanol, butanol, 2-ethylhexanol, isophorone, 4-methoxy-pentanone, ethylene and propylene glycol and the monoethyl, monobutyl and monohexyl ethers of ethylene glycol. A particularly suitable propylene glycol phenylether for this use is commercially available from Dow Chemical as DOWANOL® PPH. The amount of coalescing solvent can be up to 40 weight percent, and is generally between about 0.01 and 25 percent and when used, such as about 0.05 to about 5 percent by weight based on the weight of the aqueous medium.

Pigment and if desired various additives such as surfactants, wetting agents, plasticizers, defoamers, anti-cratering agents, light stabilizers, catalysts or microgels are included in the composition. Pigments may be of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin or pigment-to-binder (P:B) ratio. In the practice of the present invention, the P:B is usually within the range of 0.01 to 10:1.

Examples of suitable surfactants and wetting agents include alkyl imidazolines such as those available from Geigy Industrial Chemicals as GEIGY AMINE C, and acetylenic alcohols available from Air Products and Chemicals as SURFYNOL. Examples of defoamers include a hydrocarbon containing inert diatomaceous earth available from Crucible Materials Corp. as FOAMKILL 63. Examples of anti-cratering agents are polyoxyalkylene-polyamine reaction products such as those described in U.S. Pat. No. 4,432,850. These optional ingredients, when present, are usually used in an amount up to 30 percent by weight, typically about 1 to 20 percent by weight based on weight of resin solids in the composition. Light stabilizers, or UV absorbers, can be added to augment the durability of the present compositions, particularly when used as topcoats; examples include hindered amine light stabilizers.

The present invention is further directed to a method for reducing the gloss of an electrodeposited coating composition comprising adding to an electrodepositable composition an effective amount of the solid particulate polymer. "Effective amount" as used in relation to the particulate polymer or polymer additive refers to that amount of the polymer additive needed to impart the desired level of gloss. As noted above, the higher the polymer additive concentration, the lower the gloss. It will be appreciated that the amount of particulate polymer additive will also affect the durability of the product, and this can also be taken into account when determining the appropriate amount of additive for a given application. The electrodepositable resin can be any cationic or anionic resin described above.

The present invention is further directed to a method for making an anti-settling electrocoat composition comprising adding the solid particulate polymer to an electrodepositable resin. As noted above, the present compositions provide anti-settling properties that have not been seen in previous commercial products. The terms "anti-settling" and "non-settling" as used herein generally refer to products in which the solids either do not experience appreciable settling or in which solids that do settle will easily redisperse into the bath. E-coat compositions are typically regarded as "anti-settling" when the sedimentation rate, as determined on a DYNOMETER from Byk Instruments, is lower than 25 mg/hour, or "low settling" when the reading is less than 50 mg/hour (diameter of the disk 8.25 mm and volume of the disk of 4 ml).

The present invention is further directed to an electrocoat composition having a sedimentation rate, determined as described above, of less than 50 mg/hour, wherein the coating deposited from the composition has a 60° gloss of 70 or less and a gloss retention of 50% or greater following 300 hours of QUV exposure. The sedimentation rate can be lower than 25 mg/hour in some embodiments. Similarly, 60° gloss can be lower than 40, such as about 20, and gloss retention after 300 hours of QUV exposure can be >70%, such as 80% or even higher.

The present invention is also directed to methods for electrocoating a conductive substrate comprising applying to said substrate one or more of the compositions described above. The methods can be used for applying any number of layers and any kind of layer to a conductive substrate. Because of the superior weatherability and other durability characteristics of the present compositions, the methods are particularly suitable for the application of a topcoat. Primer layers are also particularly suitable for deposition according to the present invention.

Standard electrodeposition methods and parameters can be employed in carrying out the electrocoating method of the present invention. Basically, an adherent film of the present coating compositions is deposited on the substrate when a sufficient voltage is impressed between the electrodes. The applied voltage may be varied and can be, for example, as low as one volt to as high as several thousand volts; typically the voltage will be between about 50 and 400 volts. The current density is usually between 1.8 ampere and 7.5 amperes per square foot and tends to decrease during electrodeposition, indicating the formation of an insulating film.

Any substrate that is conductive, or that can be made to be conductive, is suitable for use in the present methods. Examples include, but are not limited to, metal substrates such as cold rolled steel, and preferably corrosion-resistant, electrically conductive substrates such as stainless steel and steel surface-treated with any of zinc metal, zinc compounds and zinc alloys (including electrogalvanized steel, hot-dipped galvanized steel, GALVANNEAL steel, and steel plated with zinc alloy). Copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in U.S. Pat. Nos. 4,157,924 and 4,186,036. Cold rolled steel is also suitable when pretreated with a solution selected from the group consisting of a metal phosphate solution, an aqueous solution containing at least one Group IIIB or IVB metal, an organophosphate solution, an organophosphonate solution, and combinations thereof.

The substrate may alternatively comprise more than one metal or metal alloy such as a combination of two or more metal substrates assembled together, for example a hot-dipped galvanized steel assembled with aluminum substrates. Other substrate combinations that are commonly used in the assembly of automobile bodies and in other industrial applications are suitable as well.

After electrodeposition of the coating, a curing step is usually effected at an elevated temperature. Standard curing parameters can be employed according to the present invention. Typically, a temperature range of between about 80 and 210° C. is applied for a period of time between about 10 and 60 minutes, depending on the type of layer.

The thickness of the film that results from the present methods can range from about 7.5 to 100 microns, depending on the needs and desires of the user. Typically, for a topcoat, the coating layer will be approximately one mil thick, that is approximately 25 microns. For a primer layer, a thickness of between about 0.6 and 1.4 mils, such as between about 0.8 and 1.0 mils is typically desired. Fasteners may be coated with layers of less than 25 microns; in this application use of the polymer additive helps to obtain special torque forces and allows for precise manufacturing tolerances resulting in thicknesses, for example, of 25 microns +/−1 micron, or 15 microns, +/−1 micron. The compositions can be used to coat optical machines and microscopes with layers between 7.5 and 30 microns. It can be used in combination with polytetrafluoroethylene (PTFE) between 10 and 30 microns to decrease the friction of glass coats, as a decorative application by coating directly on a coil between 10 and 30 microns, and for coating cell phones and other objects between 15 and 100 microns.

The coating layers achieved according to the present methods can be medium gloss to low gloss layers. As defined above, medium gloss refers to readings between 40 and 70 and low gloss refers to readings of less than 40, as measured using a 60° meter. The achievement of the superior durability and corrosion resistance exhibited by the medium and low gloss coatings of the current invention has not been achieved with other flatting agents, the use of which typically compromises the durability of the coating. The present methods and compositions therefore provide a significant advance over the art. In addition, the present methods allow for the deposition of a high gloss layer, whose gloss level is lower than that achieved without the current polymer additives. For example, 60° gloss readings of 80 or less are typically desired for primer coats, and can be achieved according to the present invention.

As noted above, the present methods and compositions can be used in the application of any number of E-coat layers, and can further be used in a number of different kinds of layers known in the art. For example, the compositions can be used in both one-coat and two-coat systems. A two-coat electrocoat is most often used when both corrosion resistance and exterior durability is desired. For example, a conductive epoxy basecoat, such as POWERCRON® 590-634 commercially available from PPG, can be used with a topcoat layer of the present invention. The present compositions can also be used as the second layer of a two-layer primer. Such primer layers are described in U.S. Pat. No. 6,248,225 B1, incorporated herein by reference. The present coating compositions, when used as a primer, can then be treated with any number of additional coating layers. Suitable layers include any of those known in the art, such as base coats, clear coats, pigmented monocoats, and color-plus-clear composite compositions; each may be waterborne, solventborne or powdered.

The present compositions and methods for applying the same are useful in the manufacture of a number of products. Examples include, but are not limited to, windshield wiper blades, photography equipment, agricultural equipment, office furniture, air registers, automobile parts, garages, doors, windows, walls, aviation equipment, radiators and the like.

As used herein, as used in the examples or unless otherwise expressly specified, all numbers may be read as if prefaced by the word "about", even if the term does not expressly appear. Also, any numerical range recited herein is intended to include all sub-ranges subsumed therein. As used herein, the term "polymer" refers to oligomers and both homopolymers and copolymers.

EXAMPLES

The following examples are intended to illustrate the invention, and should not be construed as limiting the invention in any way. Weights are given in grams unless noted otherwise.

Example 1

A paste was prepared using the ingredients shown in Table 1.

TABLE 1

| Raw Materials | Total Weight | Total Solids | Resin Solids | Pigment Solids |
|---|---|---|---|---|
| E8004* | 397 | 247.2 | 61.8 | 185.4 |
| DECOSILK ART** | 11 | 11 | 11 | — |
| Total | 408 | 258.2 | 72.8 | 185.4 |

*E8004 is a cationic epoxy pigment paste available from PPG Industries, Inc.
**DECOSILK ART is a solid polymethyl methacrylate having an average particle size of 10 microns, commercially obtained from Maroon, Inc.

The DECOSILK was incorporated into the E8004 by means of a Cowles mixer for approximately 30 minutes. The polymethyl methacrylate particles comprised 15.1 percent by weight of the total paste resin solids and 2.7 percent of the total paste weight. The paste as prepared above and a cationic polyurethane resin available from PPG as E8003 were mixed with water to make an E-coat bath. The amount in grams of each component are shown in Table 2. The bath contained 1.5 percent DECOSILK ART calculated on weight of the total bath resin solids and was formulated to have a P:B of 0.25 and a total solids level of 12 percent.

TABLE 2

| Raw Materials | Total Weight | Total Solids | Resin Solids | Pigment Solids |
|---|---|---|---|---|
| E8003* | 846.4 | 332.3 | 332.3 | — |
| Paste | 203.8 | 128.9 | 36.4 | 92.6 |
| Water | 2749.8 | — | — | — |
| Total | 3800 | 461.2 | 368.7 | 92.6 |

*E8003 is a cationic polyurethane resin, commercially available from PPG Industries, Inc.

Hot dipped galvanized zinc iron alloy panels treated with a conductive phosphate rinse, obtained from ACT Laboratories, were E-coated with an epoxy electrodeposition primer, commercially available from PPG as ED7151, as a first coat. Coating was done at 92° F., 140 volts for two minutes, followed by a bake for 30 minutes at 375° F. in an electric oven for a dry film thickness ("DFT") between 0.7 and 0.8 mils. A composition prepared as described above was applied by electrodeposition as a second coat to the panels. The electrodeposition was carried out at 90° F., 230 volts for two minutes; the panels were then baked for 30 minutes at 375° F. in an electric oven. The panels coated in this manner had a 20° gloss of 58.5 and a 60° gloss of 80.7. The dry film thickness was approximately 1.4 mils. A control lacking the DECOSILK was prepared and coated at 90° F., 220 volts for two minutes for a DFT of 1.38 mils. The panels coated with control had a 20° gloss of 67.5 and a 60° gloss of 86.6. Thus, the present compositions have reduced gloss as compared with compositions lacking the present particles.

A horizontal settling test was run with a three minute shutdown of the stirrer and a coat out at 90° F., 160 volts for one minute with the stirrer off. The vertical profile for the particle containing composition was 15 micro-inches and the horizontal profile was 22 micro-inches, as measured by a Taylor/Hobson surtronic 3+ Profilometer, stroke setting 0.1 inch. The nonparticle containing composition had a vertical profile of 14 micro-inches and a horizontal profile of 13 micro-inches.

A pump test was also performed using a recirculating pump for 24 hours at 95° F. The paint of the invention was filtered through a 400 mesh screen. The residue on the screen was 0.069 grams, indicating very good stability. The control paint left 0.2464 grams of residue. Although the results are quite good for both paints (anything less than about 0.5 grams is good), it is unexpected that the particle containing paint left less residue.

Example 2

A paste was prepared as described in Example 1, but with a polymethyl methacrylate having an average particle size of 5 microns; the particles were commercially obtained from Sekisui Plastics Company, Ltd. as MB-30X5. An electrodeposition bath was formed with the paste, E8003 and water in the amount in grams shown in Table 3.

TABLE 3

| Raw Materials | Total Weight | Total Solids | Resin Solids | Pigment Solids |
|---|---|---|---|---|
| E8003 | 767.4 | 332.3 | 332.3 | — |
| Paste | 204.1 | 129.1 | 36.4 | 92.6 |
| Water | 2828.5 | — | — | — |
| Total | 3800.0 | 461.4 | 368.7 | 92.6 |

The coating was deposited by electrodeposition, as described in Example 1; the coating of the present composition was electrodeposited under two different conditions:

| 90° F./200 V/2 min | 1.39 mil | 20° = 49.4 | 60° = 77 |
|---|---|---|---|
| 90° F./220 V/2 min | 1.55 mil | 20° = 48.6 | 60° = 76.3 |

Horizontal settle of the product was determined after a 3 minute shut-down at 90° F., 140 volts, for 1 minute with no stirring; under these conditions, the horizontal settle was deemed to be acceptable.

The coating was subjected to a recirculating pump test as described in Example 1; 0.0168 grams of the coating had been deposited on the filter. This again indicates the stability of the present composition.

Example 3

To formulate an electrodeposition coating suitable for use as a one-coat cationic acrylic, the following paste was prepared:

TABLE 4

| Raw Materials | Resin Solids | Pigment Solids | Total Weight |
|---|---|---|---|
| CP639* | 73.6 | 73.7 | 390 |
| DECOSILK ART | 110.0 | 0 | 110 |
| Total | 183.6 | 73.7 | 500 |

*CP639 is a black cationic paste commercially avaliable from PPG Industries, Inc.

For the paste outlined in the Table 4, the pigment-to-binder ratio (P:B) was 0.40. The total pigment solids were 14.74 percent and the resin solids were 36.72 percent based on total weight of the paste. The DECOSILK ART, which comprised 60 percent by weight of the paste resin solids and 22 percent of the entire paste weight, was incorporated into the CP639 paste by use of a high-speed mixer. The mixture was blended on high speed for 20 minutes, and the paste was used to make the following electrodeposition bath:

TABLE 5

| Raw Materials | Resin Solids | Pigment Solids | Total Weight |
|---|---|---|---|
| CP930* | 169.3 | 0 | 616 |
| Paste | 43.0 | 17.2 | 117 |
| Deionized Water | 0 | 0 | 3067 |
| Total | 212.3 | 17.2 | 3800 |

*CP930 is a cationic acrylic resin commercially available from PPG Industries, Inc.

The bath was designed to have a P:B ratio of 0.08 and a total solids level of 6 percent. Once prepared, this bath was ultrafiltered 50 percent by volume and the permeate volume was replaced with deionized water. An addition of 2 percent DOWANOL PPH (calculated on bath weight) was made to the ultrafiltered bath. In this final bath, the DECOSILK ART particles comprised 12.2 percent of the total bath resin solids.

To check appearance and verify the flatting properties of the composition, cold rolled steel (CRS) panels were coated from the bath of Table 5. The CRS panels were pretreated with a zinc phosphate coating and a chrome sealer, and were obtained from ACT Laboratories as C710 C20. Coatout parameters and film properties are listed in the following table:

| Time (sec) | Temp (° F.) | Voltage | Bake Schedule | Dry Film Thickness (DFT) | 60° Gloss |
|---|---|---|---|---|---|
| 90 | 80 | 100 | 20 min @ | 1.09 mil | 20 |
| 90 | 80 | 120 | 350° F. | 1.16 mil | 19 |

Evaluation of the panels showed a smooth low-gloss appearance. A panel prepared in the same manner but coated with POWERCRON 930-639 (prepared with CR930, CP639, and deionized water) without the polyacrylate flatting agent had a 60° gloss of approximately 80. It is clear from this example that the use of the polyacrylate additive according to present invention effectively and dramatically lowers the gloss of the electrodeposition coating.

Example 4

A low-gloss black paste was prepared as in Example 3. This paste was used to make the following cationic acrylic electrocoat baths:

TABLE 6

Paint Bath #1

| Raw Materials | Resin Solids | Pigment Solids | Total Weight |
|---|---|---|---|
| CR935* | 222.7 | 0 | 948 |
| Paste | 46.5 | 18.9 | 133 |
| Deionized Water | 0 | 0 | 1319 |
| Total | 269.2 | 18.9 | 2400 |

*CR935 is a cationic acrylic resin commercially available from PPG Industries, Inc.

Paint bath #1, for 20° gloss appearance, was formulated to have a P:B ratio of 0.07 and a total solids level of 12 percent. The polyacrylate flatting agent comprised 10.3 percent of the total resin solids of this bath.

TABLE 7

Paint Bath #2

| Raw Materials | Resin Solids | Pigment Solids | Total Weight |
|---|---|---|---|
| CR935 | 249.6 | 0 | 1062 |
| Paste | 27.3 | 11.1 | 78 |
| Deionized Water | 0 | 0 | 1260 |
| Total | 276.9 | 11.1 | 2400 |

Paint bath #2, for 40° gloss appearance, was formulated to have a P:B ratio of 0.04 and a total solids level of 12 percent. The polyacrylate flatting agent comprised 5.9 percent of the total resin solids of this bath.

A control paint bath comprising a commercial low-gloss black cationic acrylic electrocoat paint sold by PPG as POWERCRON 935-931 was used as a control. Traditional flatting agents are used in this electrocoat system to achieve a 60° gloss of 30–40. The control bath was prepared as follows:

TABLE 8

| Raw Materials | Resin Solids | Pigment Solids | Total Weight |
|---|---|---|---|
| CR935 | 188.0 | 0 | 800 |
| CP931* | 33.5 | 66.5 | 262 |
| Deionized Water | 0 | 0 | 1338 |
| Total | 221.5 | 66.5 | 2400 |

*CP931 is a cationic acrylic paste commercially available from PPG Industries, Inc.

The control bath was formulated to have a P:B ratio of 0.30 and a total solids level of 12 percent.

All three baths were filtered through 400 mesh to remove dirt and then were coated for initial appearance and horizontal settle properties. All coatouts were over zinc phosphate panels with a nonchrome rinse, obtained from ACT Laboratories as B952 P95. The bath temperatures were maintained at 80° F. during each of the 90 second coatouts. The results of these initial coatouts are outlined in the following table:

TABLE 9

Initial Panel Coatouts

| Bath | Voltage | Bake Schedule | DFT (mils) | 60° Gloss | Appearance Comments |
|---|---|---|---|---|---|
| APPEARANCE PANELS | | | | | |
| #1 | 160 | 20 min @ 350° F. | 0.96 | 22 | Smooth, even appearance |
| #2 | 140 | | 0.97 | 39 | Smooth, even appearance |
| Control | 200 | | 1.01 | 38 | Smooth, even appearance |
| HORIZONTAL SETTLE - 2 minutes without agitation | | | | | |
| #1 | 140 | 20 min @ 350° F. | 0.97 | — | No settle |
| #2 | 140 | | 0.99 | — | No settle |
| Control | 200 | | 1.03 | — | Very fine settle |

Baths were taken off of agitation, covered to minimize evaporation, and left to sit without agitation for 72 hours. At the end of 72 hours, it was noted that all three baths showed some degree of settle:

Bath #1 had 5 mm of soft settle.

Bath #2 had 3 mm of soft settle.

Control Bath had 8 mm of hard settle.

The baths were placed under moderate agitation using NALGENE polyethylene stir blades attached to electric motors. The speed was controlled for all three stirrers by a single variac. After 30 minutes of agitation, the soft settle at the bottom of baths #1 and #2 was no longer visible from the outside of the glass beaker. The settle on the bottom of the control bath was still present and was measured to be 7 mm deep.

Baths #1 and #2 were placed on magnetic stir and were coated to check appearance and horizontal settle after the 72 hour period of no agitation. The control bath could not be placed on magnetic stir due to the hard settle. Results of coatouts from Bath #1 and Bath #2 are as follows:

TABLE 10

Final Panel Coatouts

| Bath | Voltage | Bake Schedule | DFT (mils) | 60° Gloss | Appearance Comments |
|---|---|---|---|---|---|
| APPEARANCE PANELS | | | | | |
| #1 | 180 | 20 min @ 350° F. | 0.92 | 26 | Smooth, even appearance |
| #2 | 180 | | 1.04 | 42 | Smooth, even appearance |
| HORIZONTAL SETTLE - 2 minutes without agitation | | | | | |
| #1 | 180 | 20 min @ 350° F. | 0.97 | — | No settle |
| #2 | 160 | | 0.99 | — | No settle |

In addition to being checked for appearance and horizontal settle, the baths were filtered through 400 mesh. The weights of the residue collected through this filtering were:

Bath #1—0.39 grams

Bath #2—0.32 grams

Control Bath—46.9 grams hard settle

Both Baths #1 and #2 tolerated an absence of agitation for 72 hours. The soft settle generated during that shut-down period was easily reincorporated with moderate agitation. Significantly, very little residue was filtered after this period in Baths #1 and #2 as compared with control bath. Moreover, the appearance and stability of the baths according to the present invention were maintained. Thus, a medium to low gloss coating with nonsettling/low settling properties is achieved according to the present invention, as compared with a control using a traditional flatting agent.

Example 5

To determine the effects of the particulate polymer additive on the durability of certain electrocoat systems, a series of panels was prepared and tested for both QUV and Florida exposure accelerated weathering. QUV testing was conducted in an irradiance-controlled Q-panel cabinet with UVB-313 bulbs and a cycle of 8 hours UV light at 60° C. followed by 4 hours of condensation at 40° C. Florida exposure testing was conducted according to ASTM D1435, run at an exposure angle of South 45° in Fort Lauderdale, Fla.

Cold rolled steel panels with the C710 C20 pretreatment system were used as test panels. All test panels were coated for approximately 1.0 mil DFT and were baked for 20 minutes at 350° F. The two primary coatings involved in this particular durability evaluation were the DECOSILK-containing electrocoat from Example 3 and the POWERCRON 935-931 control system.

Results of the QUV testing is presented in Table 11 and Florida exposure in Table 12.

TABLE 11

| E-coat | 60° Gloss Readings/% Gloss Retention | | | | | |
|---|---|---|---|---|---|---|
| System | Initial | 100 hrs | 200 hrs | 300 hrs | 400 hrs | 500 hrs |
| Example 3 | 19 | 19/100% | 19/100% | 18/95% | 17/90% | 14/74% |
| Control | 45 | 36/80% | 25/56% | 16/36% | — | — |

The results of this QUV test show that systems matted with the DECOSILK ART polyacrylate additive have superior QUV durability compared to systems matted with traditional flatting agents. The DECOSILK ART-containing system still retained 74 percent of its initial gloss after 500 hours of QUV-B313 exposure while the control system fell below 50 percent retention before the 300 hour checkpoint.

TABLE 12

| E-coat | 60° Gloss/% Gloss Retention | | | | |
|---|---|---|---|---|---|
| System | Initial | 3 Months | 6 Months | 9 Months | 12 Months |
| Example 3 | 20 | 16/80% | 16/80% | 17/85% | 18/90% |
| Example 3 | 20 | 16/80% | 16/80% | 19/95% | 20/100% |
| Control | 44 | 27/61% | 19/43% | 13/30% | 14/32% |
| Control | 44 | 29/66% | 19/42% | 15/34% | 15/34% |

The gloss readings taken at 3, 6, and 9-month intervals were on unwashed panels. After being exposed in Florida for 12 months, the panels were washed before final gloss readings were taken. As with the QUV test results, these Florida test results show that systems formulated with the DECOSILK polyacrylate additive have superior durability compared to systems formulated with traditional flatting agents.

It has been very difficult to design stable coatings in the 15–30 gloss range when using traditional flatting agents, such as the ones used in the POWERCRON 935-931 control system. Use of the polyacrylate additive of the present invention allows for glosses in the very low range of 15–30 without compromising bath stability, uniform coating appearance, or durability.

Example 6

A medium-gloss black electrodeposition coating composition suitable for use as a highly durable topcoat in a two-coat electrocoat system was formulated using the DECOSILK ART polyacrylate powder. This was done by first grinding a high gloss black cationic acrylic paste and then mixing in the DECOSILK ART. A ratio of 0.25 grams DECOSILK ART to 1.0 grams carbon black pigment was used to achieve the desired 60° gloss appearance. After preparing the medium gloss pigment paste (referred to herein as CP971A), an electrocoat bath was made at 0.10 P:B and 12 percent total solids using CR935 resin, the CP971A pigment paste, and deionized water.

The control system for this evaluation was a high gloss black cationic acrylic electrocoat, commercially available from PPG as POWERCRON 935-971, which does not have any flatting agent. As with the medium gloss bath, this control bath was made up at 0.10 P:B and 12 percent total solids.

In order to prepare the two-coat panels for appearance and performance evaluation, a series of conductive basecoat panels were coated. The basecoat used in this study was PPG's POWERCRON 590-634. Three different substrates were coated with this conductive basecoat for 1.0 mil DFT and were baked for 20 minutes at 375° F. The three substrates were:

1. Bare, unpolished aluminum

2. CRS, Iron phosphate, Chrome Sealer—ACT B1000 P60

3. CRS, Zinc phosphate, Non-Chrome Sealer—ACT B952-P95

The control high gloss and the DECOSILK-containing medium gloss topcoats were applied over this conductive basecoat for a topcoat DFT of 1.0–1.1 mils.

The two-coat panels were evaluated through a wide range of performance tests, most notably 750 hour and 1000 hour salt spray (ASTM B117) and 1148 hour weather-o-meter (WOM) tests (SAE J1960). The aluminum panels were subjected to WOM testing while the CRS panels were used for salt spray evaluation. Results of these tests are presented in the following table:

TABLE 13

Salt Spray Results

| | | Ave. Total Scribe Creep (mm) | |
|---|---|---|---|
| System | Substrate | 750 Hours | 1000 Hours |
| P935-971 | B1000 P60 | 1.69 | 2.23 |
| | B952 P95 | 0.81 | 1.15 |

TABLE 13-continued

Salt Spray Results

| | | Ave. Total Scribe Creep (mm) | |
|---|---|---|---|
| System | Substrate | 750 Hours | 1000 Hours |
| CP971A | B1000 P60 | 1.65 | 2.79 |
| | B952 P95 | 1.38 | 1.75 |

TABLE 14

Weather-O-Meter Results

| System | Initial Gloss 20°/60° | Final Gloss 20°/60° | 20°/60° % Retention | Color Change (ΔE) |
|---|---|---|---|---|
| P935-971 | 72/85 | 51/76 | 71%/89% | 0.77 |
| CP971A | 27/57 | 22/52 | 82%/91% | 0.77 |

These salt spray and WOM tests show that a medium gloss coating using the polyacrylate additive of the present invention has corrosion-resistance and color retention comparable to that of a high gloss formula. Typically, medium gloss formulations known in the art are far inferior to high gloss formulations. A medium gloss coating that provides a good balance between corrosion resistance and durability is therefore a significant achievement.

Example 7

DECOSILK ART was prepared in a clear anionic electrocoat system commercially available from PPG as POWERCRON AR210. In this resin mixture, the DECOSILK ART comprised 20 percent of the total resin solids. To make the clearcoat bath, the resin mixture was reduced with deionized water to a total solids level of 10 percent; a small amount of amine was added as a solubilizer. The control clearcoat for this study was prepared in the same manner without the DECOSILK ART. Cold rolled steel B1000 P95 panels (from ACT—iron phosphate with a non-chrome sealer) and aluminum panels were coated to evaluate appearance and gloss.

TABLE 15

| | 60° GLOSS READINGS | |
|---|---|---|
| SYSTEM | B1000 P95 | Aluminum |
| P210 Clear containing DECOSILK | 30 | 46 |
| P210 Clear Control | 108 | 119 |

The polyacrylate flatting agent was very effective in lowering the gloss of the anionic clear electrocoat. Appearance of the system was smooth and even.

Example 8

DECOSILK ART was evaluated for effectiveness as a flatting agent in white and black anionic electrocoat systems. Four electrocoat baths were prepared as follows:

Bath #1—White Control

Commercially available from PPG as POWERCRON 210-274, this anionic electrocoat bath was formulated to have a P:B of 0.45 and a total solids level of 10 percent.

| Raw Materials | Resin Solids | Pigment Solids | Total Weight |
|---|---|---|---|
| AR210* | 146.8 | 0 | 208 |
| AP274** | 18.6 | 75.2 | 119 |
| Deionized water | 0 | 0 | 2073 |
| Total | 165.4 | 75.2 | 2400 |

*AR210 is an anionic acrylic resin, commercially available from PPG Industries, Inc.
**AP274 is a white anionic acrylic paste, commercially available from PPG Industries, Inc.

Bath #2—DECOSILK-Containing White

DECOSILK ART was incorporated into the AP274 paste portion of this electrocoat system prior to reduction in the electrocoat bath. A 30-minute high-speed stir was sufficient to disperse the polyacrylate powder in the anionic paste. The DECOSILK comprised 63 percent of the total paste resin solids and 17 percent of the total resin solids of the electrocoat bath.

| Raw Materials | Resin Solids | Pigment Solids | Total Weight |
|---|---|---|---|
| AR210 | 147.7 | 0 | 210 |
| AP274 | 18.9 | 76.2 | 121 |
| DECOSILK ART | 33.9 | 0 | 34 |
| Deionized water | 0 | 0 | 2035 |
| Total | 201.5 | 76.2 | 2400 |

Bath #3—Black Control

Commercially available from PPG as POWERCRON 330-287, this anionic electrocoat bath was formulated to have a P:B of 0.05 and a total solids level of 10 percent.

| Raw Materials | Resin Solids | Pigment Solids | Total Weight |
|---|---|---|---|
| AR330* | 206.1 | 0 | 303 |
| AP287** | 22.5 | 11.4 | 66 |
| Deionized water | 0 | 0 | 2031 |
| Total | 228.6 | 11.4 | 2400 |

*AR330 is an anionic acrylic resin, commercially available from PPG Industries, Inc.
**AP287 is a black anionic acrylic paste, commercially available from PPG Industries, Inc.

Bath #4—DECOSILK-Containing Black

DECOSILK ART transparent 10F was incorporated into the AP287 paste portion of this electrocoat system prior to reduction in the electrocoat bath. A 30-minute high-speed stir was sufficient to disperse the polyacrylate powder in the anionic paste. The DECOSILK comprises 68 percent of the total paste resin solids and 17 percent of the total resin solids of the electrocoat bath.

| Raw Materials | Resin Solids | Pigment Solids | Total Weight |
|---|---|---|---|
| AR330 | 207.4 | 0 | 305 |
| AP287 | 22.8 | 11.6 | 67 |
| DECOSILK ART | 47.7 | — | 48 |
| Deionized water | 0 | 0 | 1980 |
| Total | 277.9 | 11.6 | 2400 |

Panels from each of the four anionic electrocoat baths were prepared using iron phosphated CRS panels with a DI water rinse, available from ACT Laboratories as C158 NO. Parameters and results of the coatouts are outlined in the following Table 16:

TABLE 16

| Bath | Coatout Voltage | DFT (mils) | 20° Gloss | 60° Gloss |
|---|---|---|---|---|
| #1 White Control | 200 | 1.01 | 52 | 81 |
| #2 White formulated with DECOSILK | 180 | 1.01 | 6 | 31 |
| #3 Black Control | 150 | 1.01 | 24 | 76 |
| #4 Black formulated with DECOSILK | 150 | 1.10 | 12 | 45 |

The DECOSILK ART polyacrylate additive was a highly effective matting agent in these pigmented anionic electrocoat systems. The appearance of panels coated out of the matted baths was excellent, providing a smooth, even texture.

Example 9

A paste was prepared by adding DECOSOFT 10, a solid polyurethane/polyurea copolymer, to MA5506/74, a commercially available pigment paste from PPG. The DECOSOFT 10 had an average particle size of 10 microns and was commercially obtained from Microchem, Switzerland. The DECOSOFT was incorporated in the MA5506/74 by means of a mixer at 7 m/second for approximately 20 minutes, using the components shown in the table below as weight percent.

| Raw Materials | Weight [%] | Weight [%] Solids | Weight [%] Binder | Weight [%] Pigments |
|---|---|---|---|---|
| MA5506/74 | 78 | 28.8 | 14.4 | 14.4 |
| DECOSOFT 10 | 22 | 22 | 22 | — |
| Total | 100 | 50.8 | 36.4 | 14.4 |

The P:B for the paste was 0.40. The total pigment solids were 14.4 percent and resin solids were 36.4 percent based on total weight of the paste. The DECOSOFT comprised 60 percent by weight of the paste resin solids and 22 percent of the entire paste weight. The pigment paste as prepared above and a cationic acrylic resin commercially available from PPG Industries, Inc. as CR930 were mixed with water to make an E-coat bath. The amount in weight percent of each component is shown in Table 17. The bath contained 12.2 percent DECOSOFT calculated on weight of the total bath resin solids and was formulated to have a P:B of 0.08 and total solids level of 6 percent.

TABLE 17

| Raw Materials | Total Weight % | Total Solids Weight % | Resin Solids Weight % | Pigment Solids Weight % |
|---|---|---|---|---|
| Water | 80.52 | 0 | 0 | 0 |
| CP930 | 16.400 | 4.428 | 4.428 | 0 |
| Paste | 3.080 | 1.567 | 1.118 | 0.44 |
| Total | 100 | 6 | 5.546 | 0.44 |

Panels were coated in the electrodeposition bath described above at 30° C., 170 volts for two minutes. The panels were cured at 190° C. for 30 minutes and subjected to a number of standard tests. Results presented in Table 18 demonstrate the desirable performance characteristics achieved according to the present invention.

TABLE 18

| Test Method | |
|---|---|
| Dry Film Thickness (ASTM D1186-A) μm | 20 |
| Pencil Hardness (ASTM D3363) | 2 H |
| Erichsen bending (ISO 6860, ASTM D 522-60) | 5 mm |
| Impact Resistance (ASTM 2794) | |
| Direct Impact | 90 cm/kg |
| Reverse Impact | 90 cm/kg |
| Initial Gloss-60° Gloss Meter (ASTM D523) % | 11 +/− 1 |
| QUV - 240 hours 60° Gloss Retention [%] | 85 |
| ETMM 883 753 700 | |
| Salt Spray Exposure - 240 hours (ASTM B117) Scribed Panels (ASTM D1654) | |
| Galvanized, zinc phosphated DI-only Rinse | 0.2 mm |
| Zinc Phosphate, DI-only Rinse | 1.5 mm |
| Edge Creepage | |
| Galvanized, zinc phosphated DI-only Rinse | 0 mm |
| Zinc Phosphate, DI-only Rinse | 0 mm |
| Humidity Resistance - 504 Hours (ASTM D2247) | |
| Zinc phosphate, DI-only Rinse | |
| 1. Rust (DIN53209) | No rust, RiO |
| 2. Blisters (DIN53209 | No blisters m0, g0 |
| 3. 1E1634 Oil - 10W-30 | |
| a. Corrosion (ASTM D610) | No. 10 |
| b. Blisters (ASTM D714) | No. 10 |
| c. Adhesion (No recovery, ASTM D3359) | 5 B |
| d. Pencil Hardness (No recovery, ASTM D3363) | 2 H |

Example 10

The long-term stability of an E-coat bath comprising the present compositions versus a control bath was evaluated as follows:

Bath #1 Control

The control bath was POWERCRON 940P-639, a cationic acrylic electrocoat made with CR940P resin, CP639 paste, and deionized water, commercially available from PPG. There are no flatting agents in the CP639 paste, so this is a high-gloss system. The paint bath was formulated to have a P:B of 0.05 and a total solids level of 12%.

| Raw Materials | Resin Solids | Pigment Solids | Total Weight |
| --- | --- | --- | --- |
| CR940P* | 260.6 | 0 | 1086 |
| CP639 | 13.7 | 13.7 | 73 |
| Deionized Water | 0 | 0 | 1241 |
| Total | 274.3 | 13.7 | 2400 |

*CR940P is a cationic acrylic resin commercially available from PPG Industries, Inc.

Bath #2

A low-gloss black paste was prepared as described in Example 3, but with additional DI water to adjust viscosity. The bath parameters were set at a P:B of 0.04 and a total solids level of 12%. The polyacrylate additive comprised 6.3% of the total resin solids in the bath.

| Raw Materials | Resin Solids | Pigment Solids | Total Weight |
| --- | --- | --- | --- |
| CR940P | 247.6 | 0 | 1032 |
| Paste | 29.3 | 11.1 | 106 |
| Deionized Water | 0 | 0 | 1262 |
| Total | 276.9 | 11.1 | 2400 |

A one-month stir test and a 72-hour pump stability test were conducted to determine bath stability. One of each bath was prepared for each of the two tests. All four baths were filtered to remove any dirt before the tests were initiated. Initial appearance, final appearance, horizontal settle, and 400-mesh filtration were determined and presented in Tables 19 and 20.

TABLE 19

One Month Stir Stability

| BATH | Initial Appearance | Initial Voltage for 1.0 mil | Final Appearance | Final Voltage for 1.0 mil | Horizontal Settle | 400 Mesh Residue |
| --- | --- | --- | --- | --- | --- | --- |
| BATH #1 | Smooth 80-gloss | 180 V | Smooth 80-gloss | 230 V | Light | 0.32 g |
| BATH #2 | Smooth 40-gloss | 220 V | Smooth 40-gloss | 260 V | Light | 0.13 g |

TABLE 20

72-Hour Pump Stability

| BATH | Initial Appearance | Final Appearance | Horizontal Settle | 400 Mesh Residue |
| --- | --- | --- | --- | --- |
| BATH #1 | Smooth 80-gloss | Smooth 80-gloss | Light | 0.34 g |
| BATH #2 | Smooth 40-gloss | Smooth 40-gloss | Light | 0.18 g |

These tests that demonstrate use of the polyacrylate flatting agent according to the present invention results in an electrocoat bath that does not destabilize on extended stir or under intense shear.

Whereas particular embodiments of this invention have been described above for purposes of illustration, it will be evident to those skilled in the art the numerous variations of the details of the present invention may be made without departing from the invention as defined in the appended claims.

Therefore, we claim:

1. An electrocoat composition comprising:
    a) an electrodepositable resin that is at least 50 percent acrylic, and
    b) an additive of an insoluble solid particulate polyacrylate.

2. The composition of claim 1, wherein the polyacrylate is polymethyl methacrylate.

3. The composition of claim 1, wherein the average particle size is less than or equal to 25 microns.

4. The composition of claim 3, wherein the average particle size is 10 microns, +/−5 microns.

5. The composition of claim 1, wherein the weight percent of b) is between about 0.01 and 30 based on the total weight of the composition.

6. The composition of claim 1, wherein the weight percent of b) is between 10 and 25.

7. The composition of claim 1, wherein said electrodepositable resin is cationic.

8. The composition of claim 1, wherein said resin is a sulfonium acrylic resin.

9. The composition of claim 1, wherein b) is contained in an electrocoat paste prior to incorporation into the composition.

10. The composition of claim 9, wherein the electrocoat paste comprises an acrylic grind vehicle.

11. The composition of claim 9, wherein the electrocoat paste comprises an epoxy grind vehicle.

12. The composition of claim 1, wherein the density of the particles is between 1 and 1.5.

13. The composition of claim 1, wherein less than 1 percent of the particles are larger than 50 microns.

14. The composition of claim 13, wherein less than 1 percent of the particles are larger than 25 microns.

15. The composition of claim 1, wherein at least 70 percent of the particles are between 2 and 15 microns.

16. The composition of claim 1, wherein said electrodepositable resin is anionic.

17. An electrocoat composition comprising a resinous phase dispersed in an aqueous medium, wherein the resinous phase comprises the composition of claim 1.

18. The composition of claim 17, further comprising one or more of pigments, surfactants, wetting agents, coalescing solvents, catalysts, plasticizers, defoamers, anti-cratering agents, and light stabilizers.

19. A method for electrocoating a conductive substrate comprising applying to said substrate a coating derived from the composition of claim 1.

20. The method of claim 19, wherein said coating has a dry film thickness of 3.0 mils or less.

21. The method of claim 20, wherein the coating has a dry film thickness of between 0.6 and 1.4 mils.

22. The method of claim 19, wherein the coating is a topcoat.

23. The method of claim 19, wherein the coating is a primer.

24. A method for making an electrocoat composition having a sedimentation rate lower than 25 mg/hr comprising adding an additive of an insoluble solid particulate polyacrylate, a insoluble particulate aliphatic polyurethane/polyurea copolymer, or both, to the electrocoat composition.

25. The method of claim 24, wherein a particulate aliphatic polyurethane/polyurea copolymer is added.

26. The method of claim 24, wherein a particulate polymethyl methacrylate is added.

27. An electrocoat paste suitable for use in an electrocoat composition, comprising:
   a) a grind vehicle; and
   b) an additive of a solid particulate polyacrylate, a solid particulate aliphatic polyurethane/polyurea copolymer, or mixtures thereof.

28. The electrocoat paste of claim 27, wherein b) is a particulate polyacrylate.

29. The electrocoat paste of claim 28, wherein b) is a particulate polymethyl methacrylate.

30. The electrocoat paste of claim 27, wherein b) is a particulate aliphatic polyurethane/polyurea copolymer.

31. The electrocoat paste of claim 27, comprising an acrylic grind vehicle.

32. The electrocoat paste of claim 27, comprising an epoxy grind vehicle.

33. The electrocoat paste of claim 27, further comprising a pigment.

34. An electrocoat composition comprising:
   a) an electrodepositable resin and
   b) an additive of a solid particulate aliphatic polyurethane/polyurea copolymer.

35. The composition of claim 34, further comprising a solid particulate polyacrylate.

36. The composition of claim 34, wherein the average particle size is less than or equal to 25 microns.

37. The composition of claim 36, wherein the average particle size is 10 microns, +/−5 microns.

38. The composition of claim 34, wherein the weight percent of b) is between about 0.01 and 30 based on the total weight of the composition.

39. The composition of claim 38, wherein the weight percent of b) is between 10 and 25.

40. The composition of claim 34, wherein said electrodepositable resin is cationic.

41. The composition of claim 34, wherein said resin is a sulfonium acrylic resin.

42. The composition of claim 34, wherein b) is contained in an electrocoat paste prior to incorporation into the composition.

43. The composition of claim 34, wherein the electrocoat paste comprises an acrylic grind vehicle.

44. The composition of claim 34, wherein the electrocoat paste comprises an epoxy grind vehicle.

45. The composition of claim 34, wherein the density of the particles is between 1 and 1.5.

46. The composition of claim 34, wherein less than 1 percent of the particles are larger than 50 microns.

47. The composition of claim 46, wherein less than 1 percent of the particles are larger than 25 microns.

48. The composition of claim 34, wherein at least 70 percent of the particles are between 2 and 15 microns.

49. An electrocoat composition comprising a resinous phase dispersed in an aqueous medium, wherein the resinous phase comprises the composition of claim 34.

50. The composition of claim 49, further comprising one or more of pigments, surfactants, wetting agents, coalescing solvents, catalysts, plasticizers, defoamers, anti-cratering agents, and light stabilizers.

51. A method for electrocoating a conductive substrate comprising applying to said substrate a coating derived from the composition of claim 34.

52. The method of claim 51, wherein said coating has a dry film thickness of 3.0 mils or less.

53. The method of claim 52, wherein the coating has a dry film thickness of between 0.6 and 1.4 mils.

54. The method of claim 51, wherein the coating is a topcoat.

55. The method of claim 51, wherein the coating is a primer.

* * * * *